US012056477B2

(12) United States Patent
North et al.

(10) Patent No.: US 12,056,477 B2
(45) Date of Patent: Aug. 6, 2024

(54) DEVICE CONTROLLER AND VIEWER

(71) Applicant: Elo Touch Solutions, Inc., Knoxville, TN (US)

(72) Inventors: Kenneth North, San Carlos, CA (US); Ragini Rajendra Prasad, Fremont, CA (US); Michael James Power, San Jose, CA (US); Haroun Ansari Mohammed Ansari, Sunnyvale, CA (US); Neeraj Pendse, Palo Alto, CA (US)

(73) Assignee: Elo Touch Solutions, Inc., Knoxville, TN (US)

( * ) Notice: Subject to any disclaimer, the term of this patent is extended or adjusted under 35 U.S.C. 154(b) by 0 days.

(21) Appl. No.: 18/144,477

(22) Filed: May 8, 2023

(65) Prior Publication Data
US 2023/0273780 A1  Aug. 31, 2023

Related U.S. Application Data

(63) Continuation of application No. 17/701,537, filed on Mar. 22, 2022, now Pat. No. 11,645,060, which is a
(Continued)

(51) Int. Cl.
*G06F 8/60* (2018.01)
*G06F 3/04847* (2022.01)
(Continued)

(52) U.S. Cl.
CPC ............ *G06F 8/60* (2013.01); *G06F 3/04847* (2013.01); *G06F 3/0486* (2013.01);
(Continued)

(58) Field of Classification Search
CPC .. G06F 3/04847; G06F 3/0486; G06F 3/0488; G06F 3/0481; G06F 8/60; H04L 67/025
See application file for complete search history.

(56) References Cited

U.S. PATENT DOCUMENTS 5,831,609 A    11/1998  London et al.
6,966,060 B1 *  11/2005  Young ................. G06F 8/60
                                                  717/172
(Continued)

FOREIGN PATENT DOCUMENTS

CN    101571932 A    11/2009
CN    103237047 A     8/2013
(Continued)

OTHER PUBLICATIONS

International Search Report and Written Opinion of the International Searching Authority, directed to related International Patent Application No. PCT/US2017/012709, dated Mar. 23, 2017; 14 pages.
(Continued)

*Primary Examiner* — Mong-Shune Chung
(74) *Attorney, Agent, or Firm* — Sterne, Kessler, Goldstein & Fox P.L.L.C.

(57) ABSTRACT

Method, apparatus and computer program product embodiments are provided for distributing and installing content and settings on client devices without receiving any user input at the client devices, which limit usage of the client device a user at the client device to a first set of the usage activities. A device controller may remotely configure and control client devices by providing instructions and content for distribution to the client devices. The instructions may cause the client devices to install the content on the client devices without requiring any user input to initiate the installation or during installation of the content. The client device may be further configured to allow management of the client device by the device controller.

20 Claims, 11 Drawing Sheets

Related U.S. Application Data continuation of application No. 16/944,650, filed on Jul. 31, 2020, now Pat. No. 11,283,902, which is a continuation of application No. 15/400,584, filed on Jan. 6, 2017, now Pat. No. 10,735,557.

(60) Provisional application No. 62/276,640, filed on Jan. 8, 2016.

(51) Int. Cl.
| | |
|---|---|
| G06F 3/0486 | (2013.01) |
| G06F 3/0488 | (2022.01) |
| G06Q 30/0241 | (2023.01) |
| H04L 67/00 | (2022.01) |
| H04L 67/025 | (2022.01) |
| H04L 67/146 | (2022.01) |

(52) U.S. Cl.
CPC ....... *G06F 3/0488* (2013.01); *G06Q 30/0241* (2013.01); *H04L 67/025* (2013.01); *H04L 67/34* (2013.01); *H04L 67/146* (2013.01)

(56) References Cited

U.S. PATENT DOCUMENTS

| | | | |
|---|---|---|---|
| 10,152,211 B2 | 12/2018 | Koushik et al. | |
| 10,204,031 B2* | 2/2019 | Assenmacher | G06F 11/3664 |
| 10,735,557 B2 | 8/2020 | North et al. | |
| 11,283,902 B2 | 3/2022 | North et al. | |
| 2001/0051988 A1 | 12/2001 | Henderson | |
| 2002/0087736 A1 | 7/2002 | Martin | |
| 2003/0200300 A1* | 10/2003 | Melchione | G06F 8/60 |
| | | | 709/201 |
| 2007/0276925 A1 | 11/2007 | La Joie et al. | |
| 2010/0083303 A1 | 4/2010 | Redei et al. | |
| 2010/0274903 A1 | 10/2010 | Wookey et al. | |
| 2011/0225619 A1 | 9/2011 | Kesireddy et al. | |
| 2011/0246812 A1 | 10/2011 | Kilgore et al. | |
| 2012/0054664 A1 | 3/2012 | Dougall et al. | |
| 2012/0084675 A1 | 4/2012 | Sirpal et al. | |
| 2012/0102428 A1* | 4/2012 | Stewart | G06F 3/0481 |
| | | | 715/781 |
| 2013/0132937 A1 | 5/2013 | Sung et al. | |
| 2013/0339871 A1 | 12/2013 | Ramini | |
| 2014/0310701 A1 | 10/2014 | Chylinski et al. | |
| 2014/0337752 A1* | 11/2014 | Cammarata | H04M 1/72475 |
| | | | 715/744 |
| 2014/0337791 A1 | 11/2014 | Agnetta et al. | |
| 2014/0365561 A1 | 12/2014 | Meyer et al. | |
| 2016/0036667 A1 | 2/2016 | Kripalani et al. | |
| 2016/0087956 A1 | 3/2016 | Maheshwari et al. | |
| 2016/0209968 A1 | 7/2016 | Taylor et al. | |
| 2016/0210016 A1 | 7/2016 | Shin et al. | |
| 2016/0299749 A1 | 10/2016 | Sharma et al. | |
| 2016/0301680 A1 | 10/2016 | Main et al. | |
| 2017/0003951 A1* | 1/2017 | Newell | G06F 9/45558 |
| 2017/0005390 A1* | 1/2017 | Zakaria | H04L 67/025 |
| 2017/0201599 A1 | 7/2017 | North et al. | |
| 2020/0366757 A1 | 11/2020 | North et al. | |

FOREIGN PATENT DOCUMENTS

| | | |
|---|---|---|
| CN | 105141699 A | 12/2015 |
| EP | 1843520 A1 | 10/2007 |
| WO | WO 2012105764 A2 | 8/2012 |
| WO | WO 2015/074150 A1 | 5/2015 |

OTHER PUBLICATIONS

International Preliminary Report on Patentability on Patentability directed to related International Patent Application No. PCT/US2017/012709, dated Jul. 10, 2018; 12 pages.
Chinese Application No. 201780016097.7, Office Action, Supplemental Search, dated Jan. 14, 2022; 1 page.
Chinese Application No. 201780016097.7, First Search Report, mailed Feb. 22, 2022; 1 page.

\* cited by examiner

600A

Application Name
[APK]                                    Delete App        [ APPLY ∧ ]

Application Description
[Test App for _____]

———————— << Advanced Features >> ————————

Browser Settings
Show Navigation Bar ☑ | Show Loading Bar ☐ | Disable Downloads ☑

Form View Mode: [Fullscreen ▽]  |  Home Page Timeout: [1 Minute ▽]

Cache Size: [2gb ▽]  |  Clear User Data and Cookies on: [Timeout ▽]

Abstract Loop
☐ Create Attract Loop
(This will create a copy of your application that can be found in the 'Linked' section of your library)
[Select App (Select)]  Play After: [1 min ▽]  [Create Linked Copy]

FIG. 6A

DEVICE CONTROLLER AND VIEWER

RELATED APPLICATION

This application is a continuation of U.S. application Ser. No. 17/701,537, filed Mar. 22, 2022, which is a continuation of U.S. application Ser. No. 16/944,650, filed on Jul. 31, 2020, now U.S. Pat. No. 11,283,902, which is a continuation of U.S. application Ser. No. 15/400,584, filed on Jan. 6, 2017, now U.S. Pat. No. 10,735,557, which claims the benefit of priority to U.S. Provisional Application No. 62/276,640, all titled "DEVICE CONTROLLER AND VIEWER," filed on Jan. 8, 2016, all of which are herein incorporated by reference in their entirety.

BACKGROUND

Technical Field

The subject matter disclosed herein relates generally to distributing content and more particularly to distributing content and settings to client devices without physically interacting with the client device.

Background

Existing approaches for remotely distributing and installing content or settings on client devices typically require a user to be present at the client device because installation requires the user to initiate or configure the installation. As an example, an operating system on the client device typically displays a message, such as a pop-up message, requesting permission from the user to initiate or continue with the installation. In other words, installation cannot continue unless the user is physically present at the client device, which is particularly cumbersome, especially when the client devices are distributed across different locations.

SUMMARY

Provided herein are system, apparatus, device, method and/or computer program product embodiments, and/or combinations and sub-combinations thereof, for distributing and installing content and settings on client devices without receiving any user input at the client devices.

An example method embodiment may include steps for remotely configuring and controlling a client device without user input at the client device where the client device limits usage of the client device by a user at the client device to a first set of usage activities, wherein the first set includes an interaction activity at the client device. Other steps of the method may include receiving, at the client device, an instruction and distributed content from a device controller and initiating installation of the distributed content on the client device without receiving any input from the user of the client device to initiate installation of the distributed content and without receiving any input from the user of the client device during the installation of the distributed content. The client device may further allow management of the client device by the device controller according to a second set of the usage activities.

An example apparatus embodiment may include a touch-sensitive display and a processor communicatively coupled to the touch-sensitive display. The processor may be configured to provide usage activities and limit usage of the client device by a user at the client device to a first set of the usage activities, wherein the first set includes an interaction activity. The processor may be further configured to receive an instruction and distributed content for display on the touch-sensitive display from a device controller and initiate installation of the distributed content on the client device without receiving any input from the user at the client device to initiate installation of the distributed content and during the installation of the distributed content. The client device may be further configured to allow management of the client device by the device controller according to a second set of the usage activities.

Another example method embodiment may include the steps for remotely configuring and controlling a client device without user input at the client device by receiving, at a device controller, a selection for remotely configuring the client device and, based on the selection, determining distributed content for transmitting to the client device. The method may further include the step of transmitting, by the device controller, an instruction and the selected distributed content to the client device, wherein the instruction is configured to cause the client device to install the selected distributed content without receiving any input from the user of the client device to initiate installation of the selected distributed content and without receiving any input from the user of the client device during the installation of the distributed content.

BRIEF DESCRIPTION OF THE DRAWINGS

The accompanying drawings are included to provide a further understanding of the claims, and are incorporated in and constitute a part of this specification. The detailed description and illustrated embodiments described serve to explain the principles defined by the claims.

FIG. 6A is a diagram of parameters that may be set on a client device without a person installing or facilitating installation of the parameters on the client device.

In the drawings, like reference numbers generally indicate identical or similar elements. Additionally, generally, the left-most digit(s) of a reference number identifies the drawing in which the reference number first appears.

DETAILED DESCRIPTION

The embodiments described below overcome the problems discussed above by utilizing connections with asymmetric elements to couple the pads of the horizontally and vertically arranged electrodes.

Figure 1:
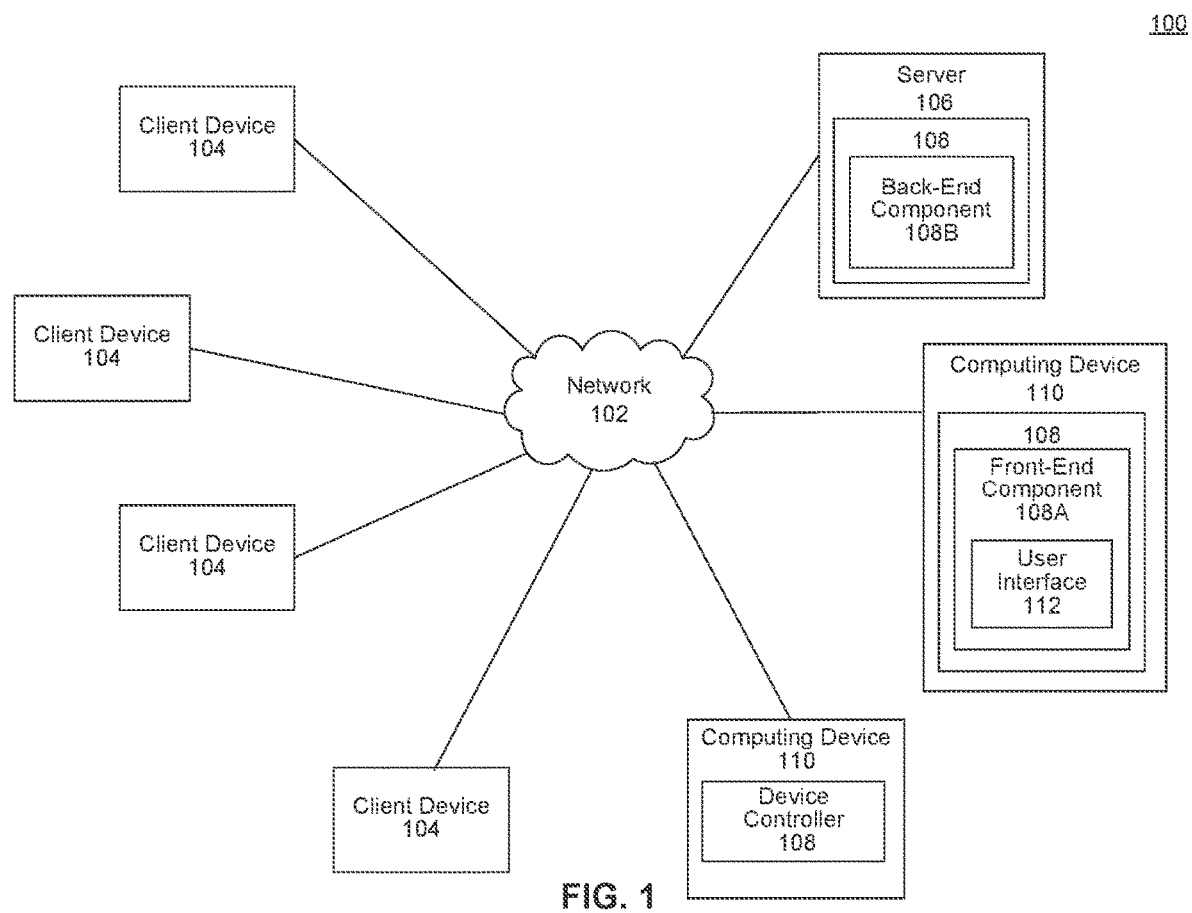
FIG. 1 is a block diagram of a system environment where embodiments can be implemented.

FIG. 1 is a block diagram 100 of a system environment where embodiments can be implemented. Block diagram 100 includes a network 102, client devices 104, a server 106, a device controller 108, and a computing device 110.

In an embodiment, network 102 may include any network or combination of networks that carry data. Network 102 includes but is not limited to, a local area network, metropolitan area network, and/or wide area network, such as the Internet. Network 102 can support technologies, such as the World Wide Web ("the Web") that provide access to services and applications using protocols, such as a HyperText Transfer Protocol ("HTTP"). Intermediate web servers, gateways, or other servers are provided between components of the system 100, depending upon a particular application or environment.

In an embodiment, servers 106 provide data, such as, content, control data, etc., to client devices 104. For example, servers 106 may download applications, data, and upgrades onto client devices 104 based on instructions provided by client devices 104 or other devices, such as a computing device 110 that includes device controller 108, which is discussed below. Servers 106 may be part of a network cloud that includes multiple servers that host applications and data, perform calculations, and distribute same to client devices 104. In an embodiment, servers 106 may include servers that provide client devices 104 with access to applications, content generated by third-parties, servers that enable communication between client devices 104, servers that include vast amounts of computing resources, such as processors and memory operable to perform mathematically intensive calculations, servers that collect and store data, servers that store files and/or folders, servers that provide client devices 104 with media content (such as digital video and/or digital audio) as programmed, on-demand, or through media streaming, servers that provide client devices 104 with access to web pages and web content, etc.

In an embodiment, client devices 104 are electronic devices controlled and/or manipulated by users. Client devices 104 request and/or receive resources, content, applications, videos, media streams, etc., from servers 106 over network 102. Client devices 104 may include, but are not limited to, personal computers, laptop computers, smartphones, tablets, kiosks, point of sale stations, etc. Additionally, client devices 104 may be computing devices that are distributed to customers and installed in customer owned locations, such as retail establishments. Once installed, client devices 104 provide access to information associated with products and services provided in the retail establishments. Additionally, client devices 104 may be used by users who enter the retail establishments and purchase the goods or services. In an embodiment, a retail establishment may place client device 104 at particular locations in the retail establishment, such as, in one or more aisles so that client devices 104 are accessible to multiple users. In another embodiment, users may carry client devices 104 throughout the retail establishment.

Figure 10:
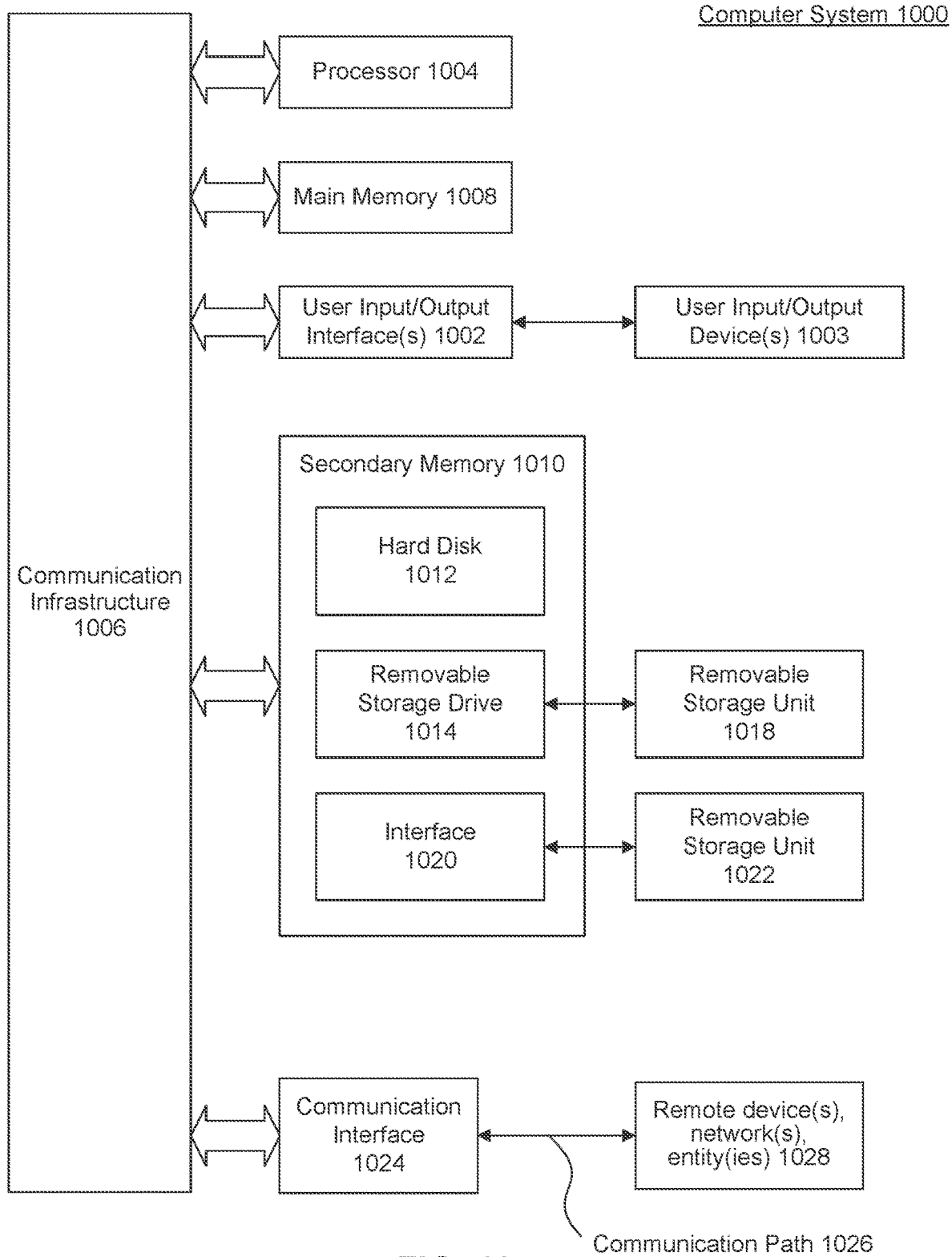
FIG. 10 is a block diagram of a computer system where the embodiments can be implemented.

Client devices 104 may have some or all components of a computing device as described in FIG. 10.

Client devices 104 may be controlled by a device controller 108. In an embodiment, device controller 108 may be installed on a computing device 110, such as a laptop, a desktop, a tablet, a smartphone, etc. In another embodiment, device controller 108 may be installed on server 106 and include a front-end component 108A and a back-end component 108B. For example, front-end component 108A may be installed on computing device 110, or be accessible using a browser of computing device 110, while back-end component 108B may operate on server 106.

In an embodiment, device controller 108 or front-end component 108A includes a user interface 112. User interface 112 displays data provided by device controller 108 and also receives input from a user, which may be a customer that purchases, rents, or owns client device 104. Based on the input, device controller 108 issues instructions that control client devices 104 or download content or applications to client devices 104. In an embodiment, once user interface 112 receives user input, front-end component 108A transmits the input to back-end component 108B, which then distributes instructions received from the input or associated with the input to client devices 104.

In an embodiment, device controller 108 eliminates user interaction with client devices 104 during set-up, application installation, or content downloads. Instead, a customer using device controller 108 may select content that is downloaded and displayed on client device 104 to the users of client device 104 in a retail establishment. Users of client device 104 at retail establishments, on the other hand, have limited interaction of client device 104. Example interaction may be limited to browsing content provided to client device 104 by device controller 108. In another embodiment, device controller 108 may also control various settings, such as brightness/contrast settings, screen resolution, speaker activation, volume control, application activation, network configuration, etc., on client devices 104 without requiring physical input from users who use client devices 104 at a retail establishment to change or agree to a change in the settings.

In an embodiment, device controller 108 allows a user to remotely manage one or more client devices 104. For example, device controller 108 determines what content client devices 104 are currently playing, determines the content client devices 104 will be playing in the future, adjusts volume on client devices 104, reboots client devices 104, determines screensavers for client device 104, etc.

In an embodiment, device controller 108 may include a content library. The content library may include content that may be played and/or installed on client devices 104. Example content may include, but is not limited to, applications, mobile applications, websites, website links, presentations (such as PowerPoint presentations), movies, advertisements, streaming content, etc. In an embodiment, content in the content library may be stored and accessed using back-end component 108B and displayed using front-end component 108A. A user (such as a customer) using device controller 108 may use front-end component 108A to select content from the library, select one or more client devices 104, and distribute the selected content to the client devices 104.

Figure 2:
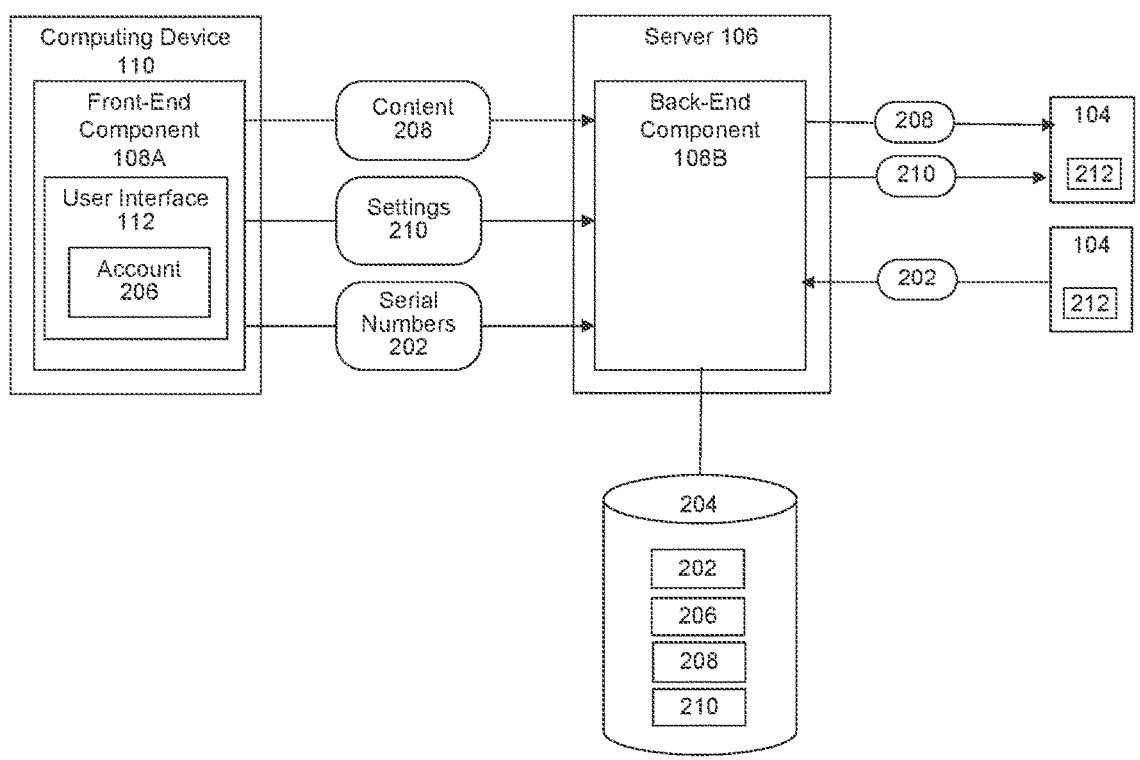
FIG. 2 is a block diagram of a device controller provisioning client devices, according to an embodiment.

In an embodiment, prior to device controller 108 installing content on client devices 104, device controller 108 sets up or provisions client devices 104 in device controller 108. The provisioning allows the customer to set settings and install content on client devices 104 without a device administrator or another user interacting with client devices 104. FIG. 2 is a block diagram 200 of a device controller provisioning client devices, according to an embodiment. Block diagram 200 describes device controller 108 in terms of front-end component 108A and back-end component 108B, but the implementation is not limited to this embodiment.

In an embodiment, client device 104 is associated with a serial number 202. Serial number 202 is unique to each client device 104 and may be assigned to client device 104 at the time that client device 104 is manufactured in a manufacturing facility. When a customer purchases client devices 104, the customer may identify the purchased client devices 104 by the serial numbers 202. In another embodiment, serial number 202 is assigned to hardware that is installed on client device 204. In this case, customer purchases the hardware and installs the hardware on client devices 204 and serial number 202 of the hardware is associated with the client device.

In an embodiment, once client device 104 is activated and powered on, client device 104 connects to network 102 and is able to communicate with other devices in network 102, such as server 106 and computing device 110. When client device 104 or hardware installed on client devices causes client device 104 to connect to network 102, client device 104 may be pre-programmed to access device controller 108 and provide serial number 202 to device controller 108 or back-end component 108B of device controller 108. Device controller 108 receives serial number 202 and stores serial number 202 in a repository associated with device controller 108. Example repository may be a database 204 or another memory device conducive to storing large amounts of data that is described in FIG. 10.

In an embodiment, client device 104 is associated with a customer. A customer is an entity that purchases or rents one or more client devices 104 that are installed in various retail establishments, such as stores, hotels, or at other locations. In order for client device 104 to be associated with a customer, the customer creates an account using device controller 108. For example, a customer may use front-end component 108A to create an account, such as account 206. Account 206 may be specific to a customer and may require customer credentials, such as a customer or system chosen user name or email address, and a corresponding password. Once a customer creates account 206, device controller 108 may store account 206 and customer credentials in database 204.

In an embodiment, a customer may use account 206 to enter serial numbers 202 of client devices 104 that are associated with the customer. For example, a customer may use front-end component 108A and user interface 112 to enter serial numbers 202. Once entered, device controller 108 associates client devices 104 having serial numbers 202 with account 206. In another embodiment, device controller 108 may associate serial numbers 202 of client devices 104 based on the criteria, such as an email or user name, that the customer used to purchase client device 104 with account 206. In an embodiment, when client device 104 connects to network 102 and accesses device controller 108, device controller 108 uses serial number 202 to identify account 206 associated with client device 104.

In an embodiment, a customer may also use account 206 to select and load content 208 to client devices 104. For example, a customer may use front-end component 108A to upload content 208 to device controller 108 or select content 208 from one of the content libraries provided by device controller 108 and displayed using front-end component 108A to a customer.

In an embodiment, there may be several sources of content 208. Content 208 may be uploaded to device controller 108 via user interface 112 and front-end component 108A and stored in the content library. Content 208 may also be provided by a third-party server that client device 104 may access using network 102. In this case, a customer may select a link that accesses the content and provides a link to a browser executing on client device 104 or causes client device 104 to download content 208 from the third-party.

In a further embodiment, a customer may use account 206 to load client device settings or simply settings 210 to client device 104. A customer may select settings 210 from the settings displayed on user interface 112. Settings 210 may include volume settings, brightness settings, contrast settings, color settings, etc.

Once selected, front-end component 108A may transmit content 208 or settings 210 to back-end component 108B. Back-end component 108B may receive content 208 and settings 210 from front-end component 108A and store content 208 and settings 210 in database 204 or in a temporary memory of server 106. Then, when client devices 104 associated with account 206 become accessible via network 102 or when device controller 108 determines that client devices 104 are connected to network 102, device controller 108 may distribute content 208 and settings 210 to client devices 104.

When client devices 104 receive content 208 and/or settings 210 from device controller 108, client devices 104 install content 208 and/or settings 210. Client devices 104 may include an operating system 212. Operating system 212 is a component that installs content 208 and/or settings 210 on client devices 104. In an embodiment, operating system 212 may be proprietary and may be modified to execute specifically on client devices 104. As part of the installation, operating system 212 installs content 208 on client devices 104 without invoking system calls or generating pop-ups that require a person's input during installation. In this way, operating system 212 seamlessly installs content 208 on client devices 104 without input or permission from persons interacting with client devices 104 in for example, retail establishments. In a further embodiment, operating system 212 also changes settings on client devices 104 as specified by settings 210. For example, operating system 212 changes the current or default volume, brightness, contrast, color, etc., settings on client devices 104 to settings 210. Similar to content installation, operating system 212 does not invoke system calls or asks permissions to change the settings, and thus, does not require input from a person using client device 104 to change the settings on client devices 104.

Figure 3:
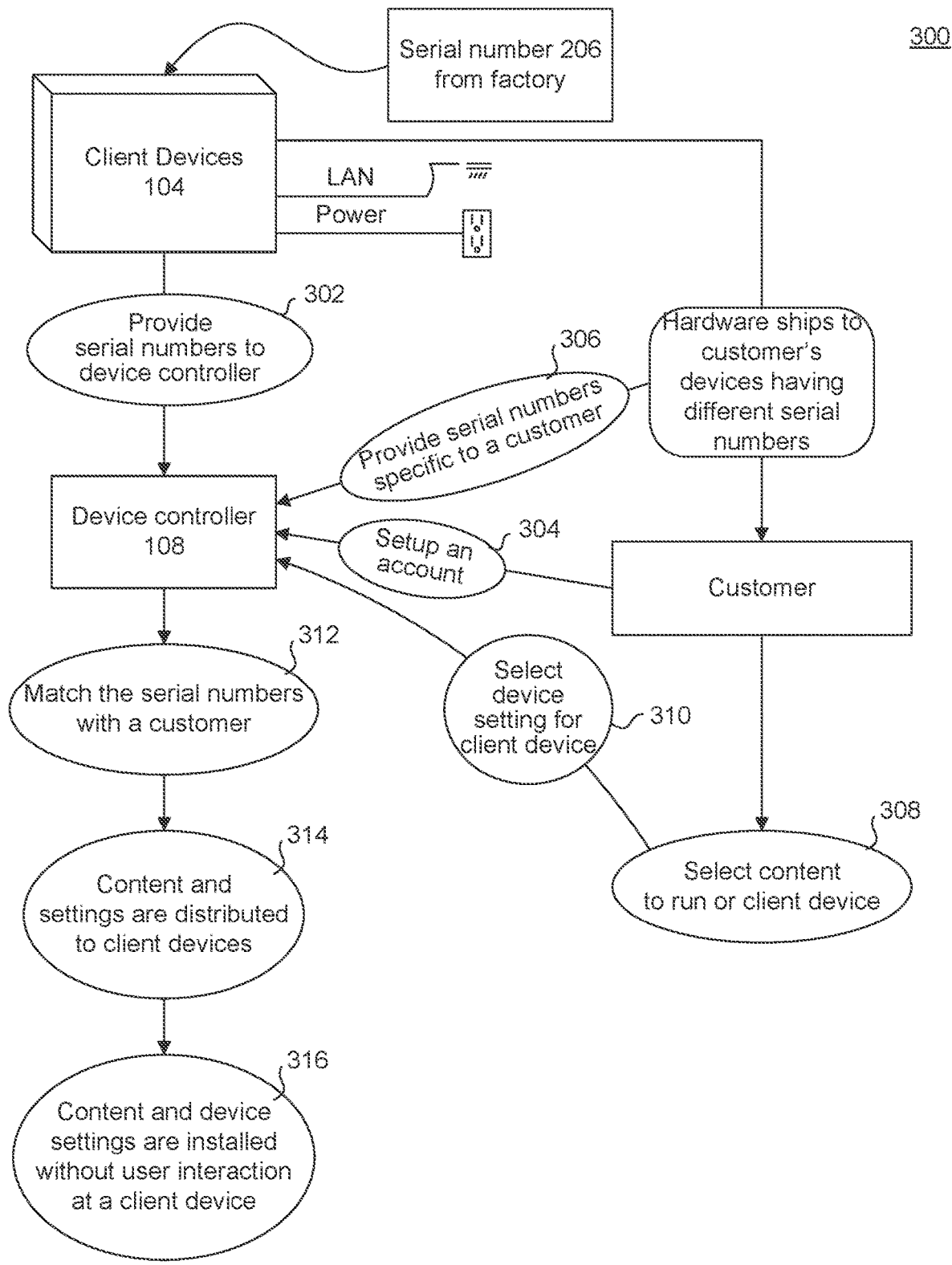
FIG. 3 is a flowchart of a method for distributing content and settings to client devices without person interaction during installation, according to an embodiment.

FIG. 3 is a flowchart of method 300 for distributing content and settings to client devices without person interaction during installation, according to an embodiment. Prior to method 300, client devices 104 or the hardware that is installed on client devices 104 is manufactured, assigned serial numbers 202, distributed to customers, and connected to network 102. Method 300 can be performed by processing logic that can comprise hardware (e.g., circuitry, dedicated logic, programmable logic, microcode, etc.), software (e.g., instructions run on a processing device), or a combination thereof.

At step 302, serial numbers are provided. For example, once client devices 104 connect to network 102, client devices 104 provide serial numbers 202 to device controller 108. As discussed above, serial numbers 202 may be assigned during manufacturing and are unique to each client device 104. Once provided, device controller 108 stores serial numbers 202 in database 204.

At step 304, an account is set up. For example, device controller 108 receives input from a customer that purchased client devices 104. The input includes instructions that set-up account 206 for the customer and customer credentials that are associated with account 206.

At step 306, serial numbers are associated with an account. For example, device controller 108 receives input from a customer that includes serial numbers 202 of client devices 104 that are owned or rented by the customer. These serial numbers 202 are associated with the customer's account 206.

At step 308, content is selected. For example, device controller 108 receives input from a customer that includes selection for content 208 to be displayed on client devices 104.

At step 310, settings are selected. For example, device controller 108 receives input from a customer that includes selection of settings 210 for client devices 104.

At step 312, serial numbers are matched and client devices are selected. For example, serial numbers 202 that are provided in step 306 are matched against serial numbers 202 that are provided in step 302. If the match is successful, client devices 104 are selected for receiving content 208 and/or settings 210.

At step 314, content and settings are distributed to client devices. For example, device controller 108 distributes content 208 and settings 210 to client devices 104 associated with serial numbers 202 matched in step 312.

At step 316, content and settings are installed. For example, client devices 104 receive content 208 and settings 210. Once received, client devices 104 install content 208 without interaction or verification with a person for proceeding with installation. Additionally, client devices 104 also install settings 210 without interaction or verification with a person for proceeding with installation.

Figure 4:
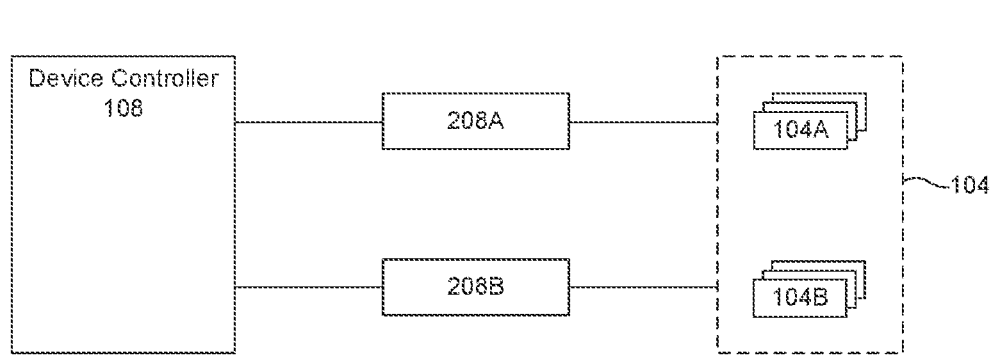
FIG. 4 is a block diagram of a device controller providing different content to client devices, according to an embodiment.

In an embodiment, device controller 108 may also be used to provide different content 208 or change content that exists and is displayed on client devices 104. In an embodiment, device controller 108 may change content 208 or a version of content 208 on client devices 104 or a subset of client devices 104 that are associated with a particular account 206. FIG. 4 is a block diagram 400 of a device controller providing different content to client devices, according to an embodiment. In block diagram 400, a customer accesses device controller 108. Device controller 108 then receives a selection for distributing content 208A to client devices 104A. In an embodiment, content 208A may be a new version of an application executing on client devices 104A of client devices 104. Once selected, device controller 108 may upload content 208A to only client devices 104A. Once content 208A is installed and successfully executes on client devices 104A, device controller 108 distributes content 208A to remaining client devices 104 associated with account 206, such as client devices 104B, if so desired.

In another embodiment, a customer accesses device controller 108. Device controller 108 then receives a selection for distributing content 208A to client devices 104A and content 208B to client devices 104B. Content 208A and content 208B may be different applications that execute in different departments of a customer's store or in different stores. Once selected, device controller 108 may upload content 208A to client devices 104A and content 208B to client devices 104B.

Figure 5:
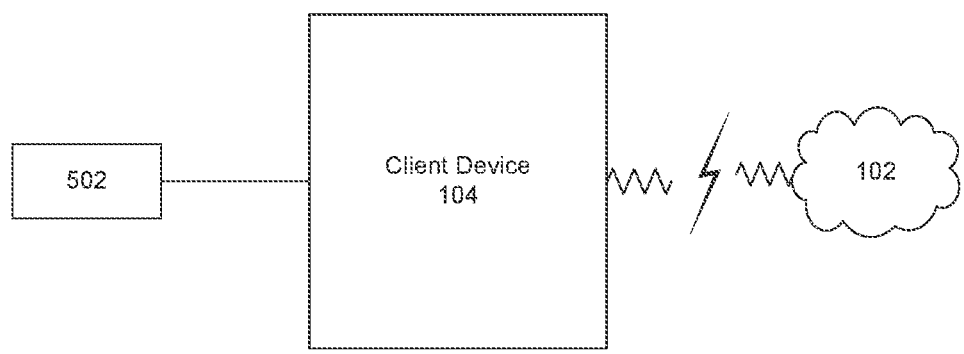
FIG. 5 is a block diagram of a client device providing content without a network connection, according to an embodiment.

In an embodiment, client device 104 may not be able to connect to network 102. FIG. 5 is a block diagram of client device providing content without a network connection, according to an embodiment. In block diagram 500, client device 104 cannot connect to network 102. When operating system 212 on client device 104 detects that client device 104 cannot connect to network 102, operating system 212 determines whether a portable memory storage device 502, such as a USB stick, is inserted into a USB port of client device 104. Once operating system 212 determines that a USB stick exists in a USB port, operating system 212 accesses a folder at a predetermined path or having a predetermined name and begins to play content 208 stored in the folder. A person skilled in the art will appreciate that memory storage devices 502 are not limited to a USB stick and may include other devices, such as a compact disc (CD) to provide content to client device 104 in the absence of a connection to network 102.

In an embodiment, content 208 stored in memory storage device 502 may be website generating content. To display a website, portable memory device 502 may include URL links and webpages described in HyperText Markup Language (HTML), EXtensible Markup Language (XML), cascading style sheets (CSS) and other languages that may be processed by a browser of client device 104 and display a website.

In a further embodiment, memory storage device 502 may provide content to client device 104 offline so that client device 104 may test the content in a controlled test environment, prior to the content being deployed to multiple client devices 104.

In an embodiment, device controller 108 may manipulate parameters on client device 104 that affect the display of content 208 on client device 104 and access to applications, settings, browser, etc., that execute on client device 104. FIG. 6A is a block diagram 600A of parameters that may be set on a client device without a person installing or facilitating the installation of the parameters on the client device.

In an embodiment, front-end component 108A via user interface 112 may provide a selection of parameters on client device 104 that may be remotely controlled by a customer using device controller 108. Example parameters may be browser parameters that control the display of content on a browser executing on client device 104. For example, browser parameters may determine whether to display a browser navigation bar, display a webpage loading bar, or disable user-initiated downloads from user-accessible websites on client device 104. Another example parameter may include the mode of content 208 displayed on client device 104, such as whether content 208 may be displayed on full screen or a portion of the screen. Another example parameter may be a homepage timeout parameter. The homepage timeout parameter controls a time interval at the end of which client device 104 may return to a home screen and display content 208 associated with the home screen. In an embodiment, the time specified in the time out parameter begins to run after receiving the last input from a person using client device 104 at, for example, a retail establishment. In an embodiment, the timeout parameter may be set to a number of minutes (or another time interval) from device controller 108. Another example parameter is a cache size parameter. The cache size parameter indicates the size of a cache that is available to a browser or another application that displays content 208. Yet another parameter may be a time interval that clears browser related cookies or user data from client device 104. For example, as a user browses content 208 on client device 104, a user may store one or more items in a shopping cart associated with a website, and then stop using client device 104 without clearing contents from the shopping cart. Device controller 108 may control the time interval during which client device 104 will keep the items in the shopping cart without deleting the items.

Other example parameters may also include web site or client device 104 specific tags or settings. These tags may be changed or manipulated using device controller 108.

Once selected, device controller 108 may transmit content 208 and/or the selected parameters to client device 104 as discussed above. In response, operating system 212 of client device 104 installs content 208 for display on client device and also stores the transmitted parameters. For example, browser parameters that control the behavior of the browser may be stored within the browser of client device 104, and the home screen parameter and timeout parameter may be stored within operating system 212 of client device 104. In an embodiment, operating system 212 installs content 208 and the transmitted parameters without invoking API or pop-ups that require additional input activity and without requiring directed response interaction with client device 104 to enable installation progression.

In another example, device controller 108 may also cause client device 104 to display content 208, such as a slide show, a video of a short advertisement, or another video clip when client device 104 is not in use or to run as a screen-saver on client device 104. In this case, content 208 may be used to attract a person browsing in, for example a retail establishment, back to client device 104 or to a product displayed on client device 104. In a further embodiment, once played on client device 104, content 208 may be interrupted and another application that has previously been used (such as a website that has previously been browsed by a person using client device 104) may be displayed.

In an embodiment, to determine content 208 that is displayed on client device 104 to attract a person at a retail establishment, front-end component 108A may provide, via user interface 112, a selection of content 208 that a customer of device controller 108 may select. As discussed above, a customer is typically an entity who owns or rents client devices 104. In an embodiment, user interface 112 may include a selection of content 208 and a timer. The timer may indicate the time interval after which content 208 may be displayed after a period of inactivity on client device 104.

Once selected, device controller 108 may transmit content 208 and the selected time interval to client device 104. In response, operating system 212 of client device 104 installs content 208 as a screensaver on client device 104 and also stores the time parameter that controls when content 208 may be played. In an embodiment, operating system 212 installs content 208 and the time parameter without invoking APIs or pop-ups that require additional input activity and without requiring directed response interaction with client device 104 to enable installation progression.

In yet another embodiment, client device 104 may be a point of sale (POS) device that includes buyer and seller displays. When client device 104 is a POS device, device controller 108 allows a customer or another person that may be associated with a customer to select different content that is displayed on the buyer display and seller display. In an embodiment, the content displayed on buyer and seller displays may be displayed at the same time. In another embodiment, client device 104 may be a PayPoint POS device that includes multiple positions for the display. In this case, content 208 displayed on client device 104 may depend on the position of the display and may change when the position of the display changes. For example, when the display faces a seller, client device 104 may display one content, but when the same display faces the buyer, client device 104 may display another content.

Figure 6B:
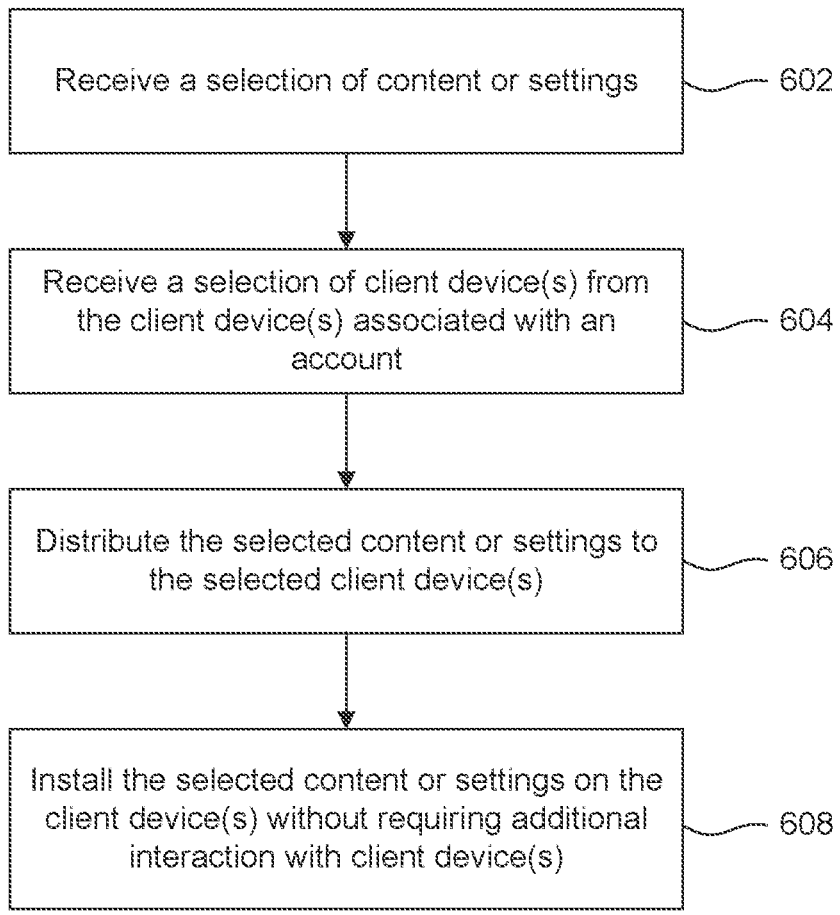
FIG. 6B is flowchart of a method for distributing content or settings to a client device, according to an embodiment.

FIG. 6B is flowchart of a method 600B for distributing content or settings to a client device, according to an embodiment. Method 600B can be performed by processing logic that can comprise hardware (e.g., circuitry, dedicated logic, programmable logic, microcode, etc.), software (e.g., instructions run on a processing device), or a combination thereof.

At step 602, a selection of content or settings is received. For example, content 208 was selected from the content library that is associated with account 206. Alternatively, one or more parameters from settings 210 were selected. In an embodiment, content 208 or settings 210 may be selected using user interface 112.

At step 604, a selection of client device(s) is received. For example, client device(s) 104 associated with account 206 are selected using device controller 108. In an embodiment, client device(s) 104 are selected using user interface 112.

At step 606, the content or settings selected in step 602 are distributed to client device(s) selected in step 604.

For example, device controller 108 matches the serial numbers of client devices 104 selected in step 604 to the serial numbers of client devices 104 that are connected to device controller 108 over network 102 and distributes content 208 or settings 210 to the matched client devices 104. In an embodiment, device controller 108 may distribute a browser link for content 208. For example, when content 208 is provided by a third-party provider, device controller may transmit a link to content 208 to client device(s) 104 and client device(s) 104 may access content 208 directly from the third-party provider using the link.

At step 608, the client device(s) receive and install content. For example, when client device(s) 104 receive content 208 or settings 210, operating system 212 that executes on client device(s) 104 installs content 208 or changes settings 210 without invoking additional interaction. Example interaction may be asking for permissions to install content 208 or requiring entering or consenting to an installation path where content 208 is to be installed. Because client device 104 does not request input, there may not be indications that content 208 or settings 210 are being installed on client device(s) 104 during use and the installation may be seamless to the user. As discussed above, operating system 212 is configured to install content 208 or settings 210 without receiving physical input from a user using client device(s) 104.

Figure 7:
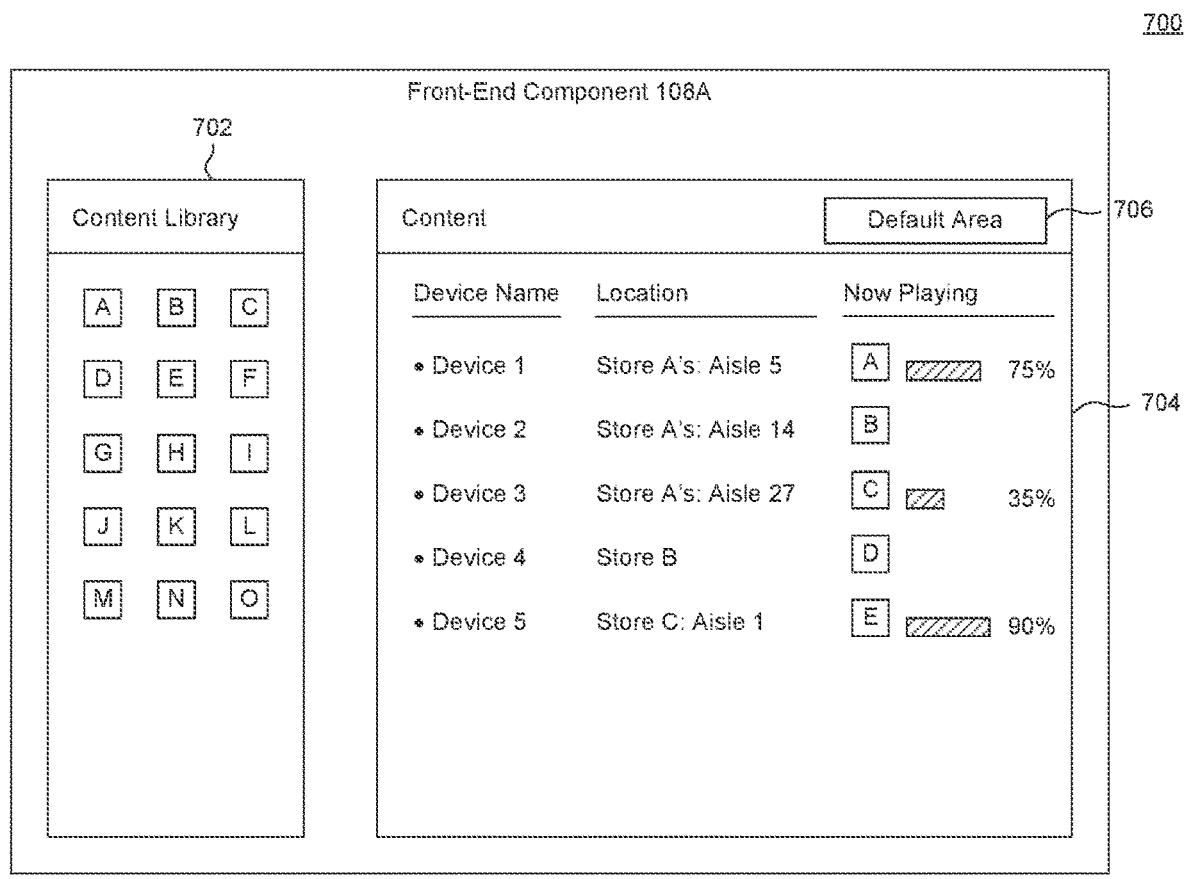
FIG. 7 is a diagram of performing drag and drop content installation, according to an embodiment.

In an embodiment, device controller 108 also enables a customer or another person to drag and drop content installation. FIG. 7 is a block diagram 700 of a device controller enabling drag and drop content installation, according to an embodiment. Block diagram 700 may be a diagram of user interface 112 of front-end component 108A of device controller 108 which enables drag and drop content installation. To enable the drag and drop content installation, user interface 112 provides a content library 702. Content library 702 includes tags or thumbnails, such as tags A-O. Each tag in tags A-O represents a particular content 208. Tags A-O may include a picture, diagram, symbol, etc., that is associated with or related to content 208 or a content provider. In an embodiment, tags A-O may also be associated with a content name, which is displayed next to or below tags A-O (not shown).

In a further embodiment, a person using device controller 108, such as a customer, may upload content 208 to content library 702 prior to selecting content 208. Once uploaded, content 208 may be associated with a particular tag or a new tag may be generated for content 208 and added to content library 702.

In an embodiment, block diagram 700 also includes a client device listing 704. Client device listing 704 includes a listing of client devices 104 (shown as devices 1-5) associated with account 206, the location of client devices 104, the content that is currently playing on the respective client devices 104, and the progress bar that indicates the amount of content 208 that has played on the respective client device 104. For example, device 1, located in a store A's aisle 5, is playing content associated with tag A and the play is 75% complete. In another example, device 4 located in store B is playing content associated with tag D, but the content is not currently playing.

In an embodiment, to add a particular content to client device 104, such as content associated with tag B, user interface 112 receives a selection of tag B from content library 702, and tag B is dragged and dropped into a device in client device listing 704, such as device 3. Once the drag and drop is complete, device controller 108 transmits content associated with tag B to the selected client device 104 as discussed above. In a further embodiment, a tag from tags A-O may also be dragged and dropped to multiple client devices 104, for example to client devices 104 that are at a particular location (not shown). Once the drag and drop is complete, device controller 108 may transmit content associated with the tag to a group of client devices 104, as discussed above. In a further embodiment, block diagram 700 also includes a default area 706. When user interface 112 receives a selection of one of tags A-O that is dragged and dropped into default area 706, device controller 108 designates content 208 associated with the tag that is dropped into default area 706 as default content. When device controller 108 transmits content 208 as default content, device controller 108 transmits content 208 to client devices 104 associated with account 206 and also transmits a parameter that instructs operating system 212 to install content 208 as default content. Default content, for example, may be used as a screen saver or home page on client device(s) 104. As discussed above, content 208 is installed as default content without additional user input on client device(s) 104.

Figure 8A:
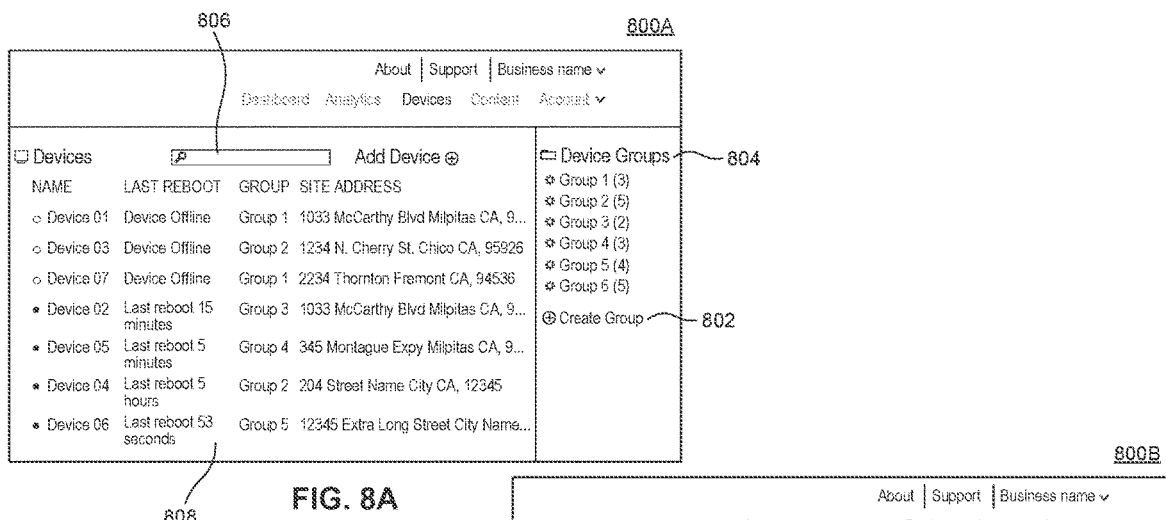
FIG. 8A is a diagram of groups of client devices, according to an embodiment.

In an embodiment, device controller 108 may also group client devices 104, and distribute content 208 or settings 210 to the one or more groups. FIG. 8A is a diagram 800A of a device controller enabling grouping of client devices into groups, according to an embodiment. Diagram 800A may be a diagram of user interface 112 of front-end component 108A of device controller 108 that enables a person (such as a customer) to group different client devices 104 that are associated with account 106. Once device controller 108 groups client devices 104 into groups, device controller 108 may transmit the selected content 208, settings 210, etc., to all client devices 104 in the group at the same time, as described above.

In an embodiment, user interface 112 in diagram 800A includes a create group 802 feature. The create group 802 feature creates a group. Once a group is created, device controller 108 via user interface 112 allows a customer to drag and drop devices into a particular group.

In another embodiment, user interface 112 also provides a listing of existing device groups 804. As part of the listing, device controller 108 may include a name of the group and the number of client devices 104 that are associated with the group. For example, group 1 includes three client devices, while group 2 includes five client devices. In a further embodiment, when user interface 112 receives a selection of a particular group, device controller 108 may display client devices 104 associated with the selected group along with the information associated with client devices 104 as shown in area 808. Example information may include the last reboot time of each client device in a group, name of the client device (which may also be a serial number 202), group that each client device belongs to, and a physical location of each client device in client device 104. In a further embodiment, area 808 may display client devices 104 from multiple groups.

In an embodiment, device controller 108 enables the dynamic grouping of client devices 104. In the dynamic grouping, device controller 108 may dynamically group client devices 104 into groups according to a search parameter, such as, but not limited to a client device name, physical address of client device, settings parameters (such as brightness), content, etc. To enable dynamic grouping, user interface 112 includes a search box 806. Search box 806 may receive the dynamic parameters from the customer or another person using device controller 108. Device controller 108 then groups client devices 104 according to the parameters entered in search box 806.

Figure 8B:
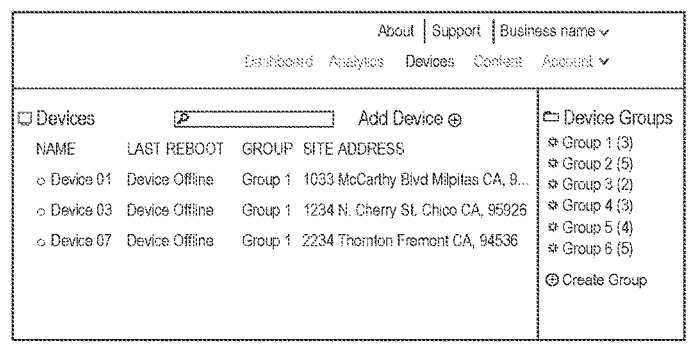
FIG. 8B is a diagram of a dynamic group of client devices, according to an embodiment.

In an embodiment, FIG. 8B is a diagram 800B of a dynamic group of client devices, according to an embodiment. For example, diagram 800B includes user interface 112 that displays client devices 104 grouped according to the time the client devices 104 were rebooted. In diagram 800B the group of client devices that have not rebooted because the client devices were offline is displayed.

Figure 8C:
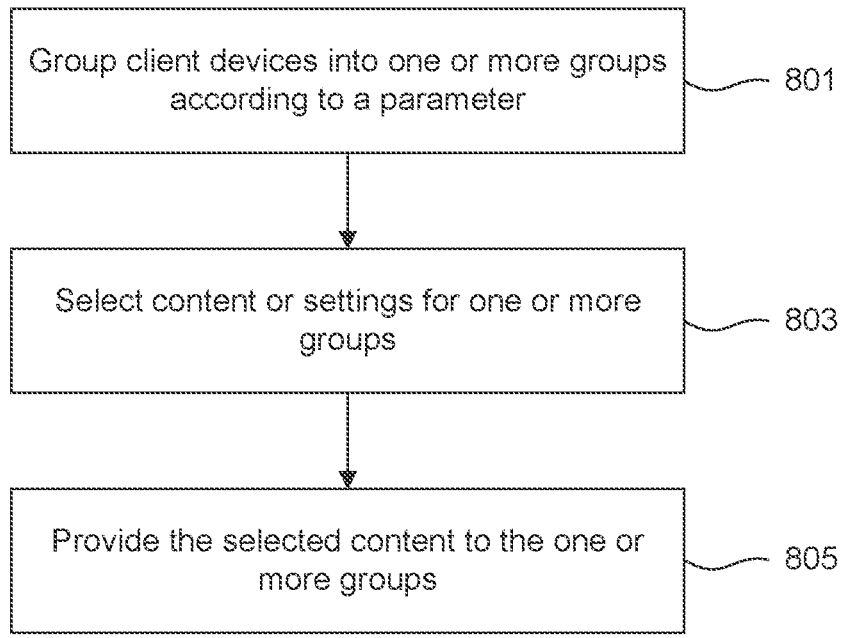
FIG. 8C is a flowchart that provides content to a dynamically selected group of client devices, according to an embodiment.

Once device controller 108 generates the dynamic groups, device controller 108 may receive instructions that provide content 208 or settings 210 to the dynamically selected group of client devices 104. Settings 210 and content 208 may cause client devices 104 to reboot, or to be updated with new content or application. FIG. 8C is a flowchart 800C that provides content to a dynamically selected group of client devices, according to an embodiment. Method 800C can be performed by processing logic that can comprise hardware (e.g., circuitry, dedicated logic, programmable logic, microcode, etc.), software (e.g., instructions run on a processing device), or a combination thereof.

At step 801, client devices are grouped into one or more groups. For example, device controller 108 receives input, such as a dynamic parameter, that causes device controller 108 to group client devices 108 into criteria specified in the dynamic parameter. The dynamic parameter may be entered by a customer, and may be based on location of client devices, a particular setting in client devices, or content played on client devices, to give a few examples.

At step 803, content or settings are selected. For example, device controller 108 receives a selection of content 208 or settings 210 that may be distributed to one or more groups of client devices 104.

At step 805, content or settings are provided to the one or more groups. For example, device controller 108 transmits content 208 or settings 210 to the one or more groups of client devices 104. In transmitting content 208 or settings 210 to one or more groups, device controller 108 eliminates a tedious task of providing content to individual client devices 104, particularly when there are hundreds or thousands of client devices associated with account 106.

In an embodiment, device controller 108 may install an application on client devices 104 that tracks activity on each client device 104. Example activity may be touch data generated by persons who interact with client devices 104 at retail establishments, facial recognition data, or other data pertaining to the activity of a user using client devices 104. The application may be installed on client devices(s) 104 using device controller 108, as described above.

Figure 9:
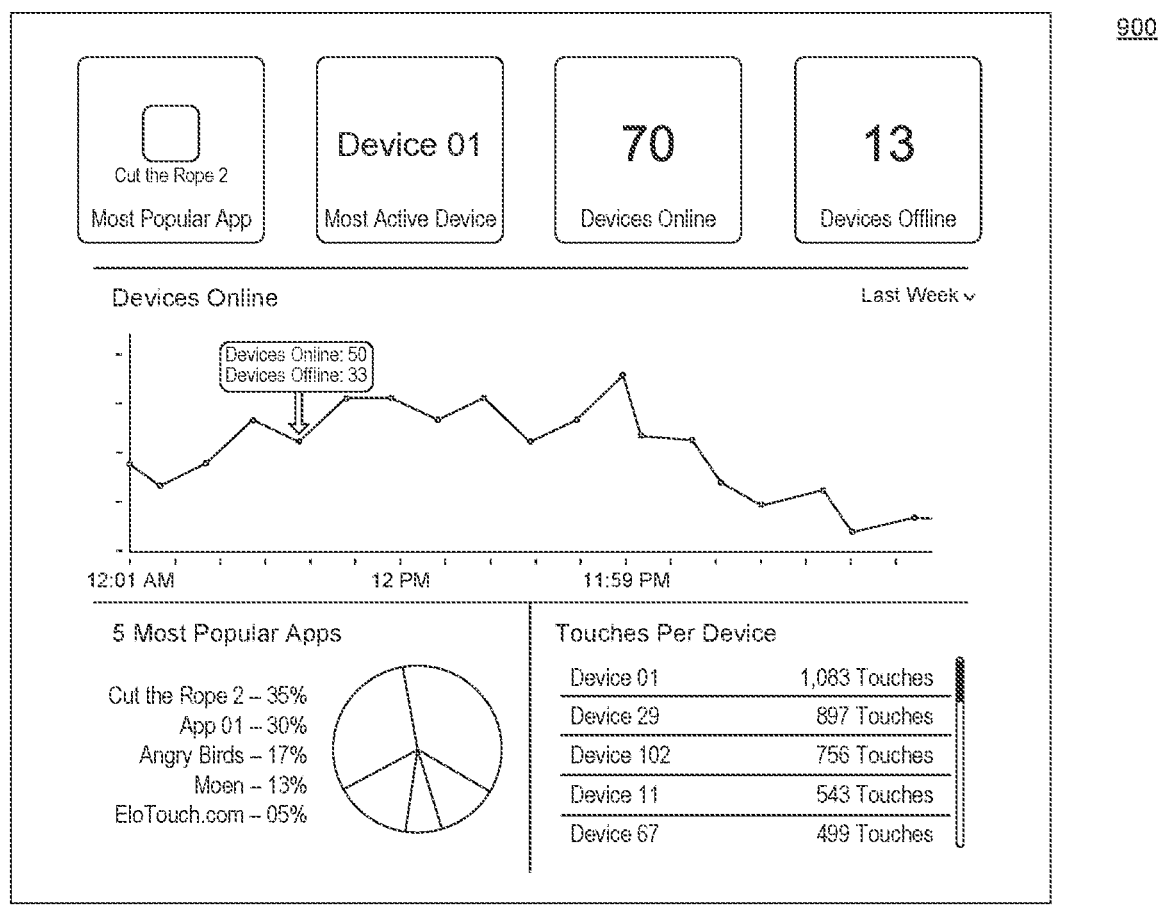
FIG. 9 is a diagram of a device controller displaying data analytics associated with client devices, according to an embodiment.

When the application executes on client device(s) 104, the application determines activity on client devices 104 and transmits information associated with the activity to device controller 108. In particular, the application may determine touch activity on client device(s) 104 caused by persons using client device(s) 104 in a retail establishment. In response, device controller 108 may aggregate the activity data from different client devices 104 and present the activity data using user interface 112. FIG. 9 is a diagram 900 of a device controller displaying data analytics associated with client devices, according to an embodiment. Example data analytics may identify content 208 that is being displayed on client devices 104, the most popular content displayed on client devices 104, the location of client devices 104 that generate the most touches on client devices 104 and are therefore interacted with most by persons at retail establishments, the most active client device 104, the number of client devices 104 that are connected to network 102 throughout the day, the number of client devices that are and are not connected to network 102 at a particular time, etc.

In an embodiment, device controller 108 may also receive various alerts or notifications from client devices 104. Example notifications may include information regarding a new application or content 208 being installed on client devices 104, settings being changed on client devices 104, the applications or content 208 being played on client devices 104, the printer connected to client device (that is, for example a POS) running out of paper, etc. Example alerts may include information that client devices 104 lost connection to network 102 and are now offline, that client devices 104 rebooted, that settings on client devices 104 changed, etc.

In an embodiment, a customer of account 206 may receive periodic emails that summarize notifications and alerts generated by the status of client devices 104 that are associated with account 206. In a further embodiment, a customer may log into account 206 and view a list of notifications that device controller 108 received from client devices 104.

In an embodiment, when user interface 112 displays notifications, notifications may be color coded based on the level of activity on client device 104. For example, notifications indicating activity associated with content installation that caused client device 104 to lose connection with network 102 may be color coded as red, notifications indicating that an upgrade on client device 104 caused client device 104 to reboot may be color coded in green, and notifications indicating activity associated with content 208 being installed on client device 104 may be color coded in blue.

Various embodiments of client device 104, device controller 108, server 106, and computing device 110 as described in FIGS. 1-9 can be implemented, for example, using one or more well-known computer systems, such as computer system 1000 shown in FIG. 10, or some or all components in computer system 1000. Computer system 1000 can be any well-known computer capable of performing the functions described herein, such as computers available from International Business Machines, Apple, Sun, HP, Dell, Sony, Toshiba, etc.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1000 also includes user input/output device(s) 1003, such as monitors, keyboards, pointing devices, etc., which communicate with communication infrastructure 1006 through user input/output interface(s) 1002.

Computer system 1000 also includes a main or primary memory 1008, such as random access memory (RAM). Main memory 1008 may include one or more levels of cache(s). Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/or any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communication path 1026, which may be wired and/or wireless, and which may include any combination of LANs, WANs, the Internet, etc. Control logic and/or data may be transmitted to and from computer system 1000 via communication path 1026.

It is to be appreciated that the Detailed Description section, and not the Summary and Abstract sections (if any), is intended to be used to interpret the claims. The Summary and Abstract sections (if any) may set forth one or more, but not all, contemplated exemplary embodiments, and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope should not be limited by any of the above-described exemplary embodiments, but should be defined only in accordance with the following claims and their equivalents.

The invention claimed is:

1. A method for remotely configuring and controlling a plurality of client devices without user input at the plurality of client devices, wherein the plurality of client devices are associated with an account identifier, and wherein the plurality of client devices comprise a first client device and a second client device, the method comprising:
receiving, at a device controller from a remote device, a user selection, wherein the user selection identifies client software to be installed on the first client device and the second client device, wherein the client software includes at least one of content or a setting of the first client device and the second client device;
identifying a third client device from the plurality of client devices based on the user selection;
based on the identifying, installing the client software on the third client device;
determining a successful installation of the client software on the third client device; and
installing the client software on the first client device and the second client device based on the successful installation of the client software on the third client device,
wherein each client device of the plurality of client devices is configured with a modified operating system, wherein the modified operating system is configured to execute specifically on each client device and is further configured to prevent at least one of invocation of a system call or display of a pop-up that requires user input during installation of the client software.

2. The method of claim 1, further comprising:
receiving, at the device controller from the remote device, a first unique identifier of the first client device and a second unique identifier of the second client device, wherein the remote device is associated with the account identifier, and wherein the user selection further includes at least one of the first unique identifier and the second unique identifier; and
associating the first unique identifier and the second unique identifier with the account identifier.

3. The method of claim 2, wherein the first unique identifier is a first serial number of the first client device.

4. The method of claim 2, wherein the user selection includes the first unique identifier and the second unique identifier.

5. The method of claim 2, further comprising:
matching the first unique identifier to the first client device and the second unique identifier to the second client device; and
selecting the first client device and the second client device based on the matching, wherein the installing the client software on the first client device and the second client device occurs after the selecting.

6. The method of claim 1, wherein the first client device is the third client device.

7. The method of claim 1, wherein the plurality of client devices are point of sale devices.

8. The method of claim 7, wherein the first client device comprises a buyer display and a seller display and wherein the client software comprises first content to be displayed on the buyer display and second content to be displayed on the seller display.

9. The method of claim 1, further comprising:
providing, by the device controller, a user interface to the remote device;
receiving, via the user interface, a first command to create a group of client devices, wherein the group of clients devices represents a subset of the plurality of client devices; and
receiving, via the user interface, a second command to assign at least one of the first client device and the second client device to the group of client devices.

10. The method of claim 1, wherein the client software further comprises a browser parameter, wherein the browser parameter is configured to control behavior of a browser installed on at least one of the first client device and the second client device.

11. A method for remotely configuring and controlling a plurality of client devices without user input at the plurality of client devices, wherein the plurality of client devices are associated with an account identifier, and wherein the plurality of client devices comprise a first client device and a second client device, the method comprising:
receiving, at a device controller from a remote device, a first unique identifier of the first client device and a second unique identifier of the second client device, wherein the remote device is associated with the account identifier;
associating the first unique identifier and the second unique identifier with the account identifier; and
receiving, at the device controller from the remote device, a user selection, wherein the user selection identifies client software to be installed on the first client device and the second client device, wherein the client software includes at least one of content or a setting of the first client device and the second client device, and wherein the user selection further identifies at least one of the first unique identifier and the second unique identifier;

wherein each client device of the plurality of client devices is configured with a modified operating system, wherein the modified operating system is configured to execute specifically on each client device and is further configured to prevent at least one of invocation of a system call or display of a pop-up that requires user input during installation of the client software.

12. The method of claim 11, further comprising:

identifying a third client device from the plurality of client devices based on the user selection;

based on the identifying, installing the client software on the third client device;

determining a successful installation of the client software on the third client device; and installing the client software on other client devices of the plurality of client devices based on the successful installation of the client software on the third client device.

13. The method of claim 11, wherein the first unique identifier is a first serial number of the first client device.

14. The method of claim 11, wherein the user selection includes the first unique identifier and the second unique identifier.

15. A method for remotely configuring and controlling a plurality of client devices without user input at the plurality of client devices, wherein the plurality of client devices are associated with an account identifier, and wherein the plurality of client devices comprise a first client device and a second client device, the method comprising:

receiving, at a device controller from a remote device, a first unique identifier of the first client device and a second unique identifier of the second client device, wherein the remote device is associated with the account identifier;

associating the first unique identifier and the second unique identifier with the account identifier;

receiving, at the device controller from the remote device, a user selection, wherein the user selection identifies client software to be installed on the first client device and the second client device, wherein the client software includes at least one of content or a setting of the first client device and the second client device, and wherein the user selection further identifies at least one of the first unique identifier and the second unique identifier;

identifying a third client device from the plurality of client devices based on the user selection;

based on the identifying, installing the client software on the third client device;

determining a successful installation of the client software on the third client device; and installing the client software on other client devices of the plurality of client devices based on the successful installation of the client software on the third client device.

16. The method of claim 15, wherein each client device of the plurality of client devices is configured with a modified operating system, wherein the modified operating system is configured to execute specifically on each client device and is further configured to prevent at least one of invocation of a system call or display of a pop-up that requires user input during installation of the client software.

17. The method of claim 15, wherein the first unique identifier is a first serial number of the first client device.

18. The method of claim 15, wherein the user selection includes the first unique identifier and the second unique identifier.

19. The method of claim 15, wherein the plurality of client devices are point of sale devices.

20. The method of claim 19, wherein the first client device comprises a buyer display and a seller display and wherein the client software comprises first content to be displayed on the buyer display and second content to be displayed on the seller display.

* * * * *